US008483664B2

United States Patent
Röbke

(10) Patent No.: US 8,483,664 B2
(45) Date of Patent: Jul. 9, 2013

(54) METHOD FOR SERVICES IDENTIFICATION FOR CONVERGENT MESSAGING SYSTEMS

(75) Inventor: Matthias Röbke, Köln (DE)

(73) Assignee: T-Mobile International AG, Bonn (DE)

( * ) Notice: Subject to any disclaimer, the term of this patent is extended or adjusted under 35 U.S.C. 154(b) by 385 days.

(21) Appl. No.: 12/443,469

(22) PCT Filed: Sep. 12, 2007

(86) PCT No.: PCT/EP2007/007943
§ 371 (c)(1),
(2), (4) Date: Oct. 27, 2009

(87) PCT Pub. No.: WO2008/037356
PCT Pub. Date: Apr. 3, 2008

(65) Prior Publication Data
US 2010/0151828 A1    Jun. 17, 2010

(30) Foreign Application Priority Data
Sep. 27, 2006   (DE) .................. 10 2006 045 506

(51) Int. Cl.
*H04L 12/58*    (2006.01)
*H04W 4/00*    (2009.01)

(52) U.S. Cl.
USPC ........................ 455/412.1; 455/466

(58) Field of Classification Search
USPC ............ 455/412, 1, 414.1, 466, 412.2, 552.1
See application file for complete search history.

(56) References Cited

U.S. PATENT DOCUMENTS

| | | | |
|---|---|---|---|
| 5,870,400 A * | 2/1999 | Van Loon et al. | 370/466 |
| 6,011,842 A * | 1/2000 | Brivet et al. | 379/201.01 |
| 6,078,820 A | 6/2000 | Wells et al. | |
| 6,161,007 A * | 12/2000 | McCutcheon et al. | 455/412.2 |
| 7,245,928 B2 * | 7/2007 | Comer et al. | 455/466 |
| 7,333,822 B2 * | 2/2008 | Laumen et al. | 455/466 |
| 7,373,602 B2 * | 5/2008 | Trenbeath et al. | 715/249 |
| 2003/0040300 A1 * | 2/2003 | Bodic et al. | 455/412 |
| 2003/0078060 A1 * | 4/2003 | Becker et al. | 455/466 |
| 2003/0125055 A1 * | 7/2003 | Kim et al. | 455/466 |
| 2003/0140224 A1 * | 7/2003 | Vatanen | 713/153 |
| 2004/0048627 A1 * | 3/2004 | Olvera-Hernandez | 455/466 |
| 2006/0095511 A1 * | 5/2006 | Munarriz et al. | 709/203 |
| 2007/0197214 A1 * | 8/2007 | Faccin et al. | 455/433 |
| 2007/0198742 A1 * | 8/2007 | Pak et al. | 709/246 |

FOREIGN PATENT DOCUMENTS

EP    1594325 A2    11/2005

OTHER PUBLICATIONS

Seh-Joon Dokko, Development of Multimedia E-Mail System Providing an Integrated Message View, IEEE, 1997, 494-498.
Bosch, Generalised Structure For a Multimedia Messaging Service, ETSI STC SMG1+SMG4+SMG12 Multimedia Tdoc, Dec. 1998, 1-2, Hanover, Germany.

* cited by examiner

*Primary Examiner* — Christopher M Brandt
(74) *Attorney, Agent, or Firm* — Browdy and Neimark, PLLC

(57) ABSTRACT

The invention relates to a method for service identification for convergent messaging systems, in which a convergent message is interchanged between a sender and at least one receiver (13) via a communication network (10). The invention provides for the message structure of the convergent message to have an information element added to it which contains information about the message type or relating to the handling of the message.

9 Claims, 1 Drawing Sheet

METHOD FOR SERVICES IDENTIFICATION FOR CONVERGENT MESSAGING SYSTEMS

Figure 1:
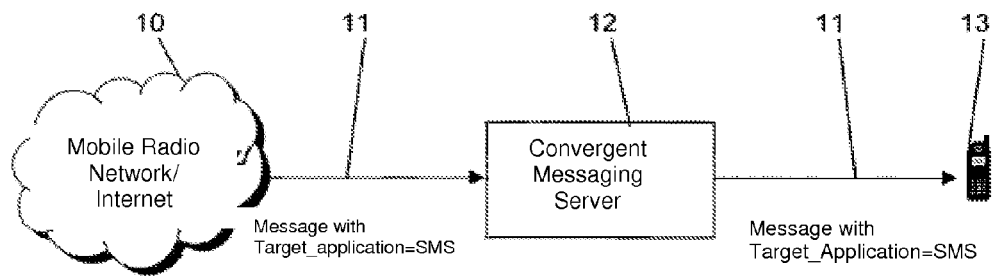

The invention relates to a method for services identification for convergent messaging systems.

In mobile technology there are various messaging services known today. These services include the Short Message Service, short SMS; the Multimedia Messaging Service, short MMS; Instant Messaging services, short IM; mobile email; Push-To-Talk services, short PTT; etc. These different messaging services are set up, according to the prior art, as individual silos, i.e. each service exists quasi-independently of the respective other service and is implemented in the corresponding communications network, e.g. a mobile radio network or the Internet, by means of devices that are independent from one another.

It is being envisioned to replace these independent services with a "convergent messaging service" within the foreseeable future. Such a converging messaging service combines the functionalities of currently existing messaging services, such as SMS, MMS, IM, email, PTT, etc., on a higher-level messaging platform. This also includes a corresponding protocol, with the aid of which a "convergent messaging server" that is connected to the network communicates with a "convergent messaging client" that is installed on a communications terminal. The convergent messaging service is capable of addressing any communications terminal that supports at least one messaging service supported by the convergent messaging service, such as mobile radio terminals, personal computers, navigation terminals, etc.

In order to address different applications, e.g. a SMS client, a MMS client, a game software, etc., on a terminal device by means of such a convergent messaging service, a mechanism is required for exchanging information regarding the target application that is to be addressed.

It is the object of the present invention to provide a mechanism for exchanging a services identifications [sic] for addressing applications in convergent messaging systems.

This object is met according to the invention by the characteristics of claim 1.

Preferred embodiments and additional characteristics of the invention are specified in the dependent claims.

According to the present invention a method is specified for modifying a protocol belonging to a convergent messaging system, in such a way that information regarding the message type and/or relating to target applications can be exchanged within a convergent message.

To accomplish this, a mechanism is proposed that makes it possible to exchange information together with the actual convergent message in order to identify an appropriate target application on the terminal device receiving the convergent message.

According to the present invention an information element is introduced into the associated protocol of a convergent message, which is referred to here as Target_Application, which uniquely identifies the target application on the receiving terminal device, or which identifies the message itself.

The corresponding target application is assigned to this information element by the sender of the convergent message. If the message content of a convergent message is to be interpreted for example by a SMS application, "Target_Application=SMS" will be specified as the information element for identifying the application. Based on this information element a SMS client on the target terminal device receiving the message is able to recognize the content of the message as a SMS and interpret and display it accordingly.

In other words, the information element contained in the convergent message is interpreted by the receiving terminal device. The receiving terminal device can thus forward the actual message content to the appropriate application that is intended or suitable for presenting or processing the message content.

Furthermore, the terminal device can utilize this information element to appropriately classify messages that are generated by the terminal device user and thus induce the target terminal device to which the message is sent to use a certain application to interpret/display the message content. Such a mechanism could, among other things, address the proper messaging client (e.g. MMS client, MMS client [sic] or IM client), in order to display the message contents accordingly.

Furthermore, it is conceivable to send, with the aid of such a method, game moves of a chess game, geographic information for city or road maps, etc. to the terminal device, which are then interpreted by the corresponding client, e.g. chess client, navigation client, and presented to the user.

Figure 2:
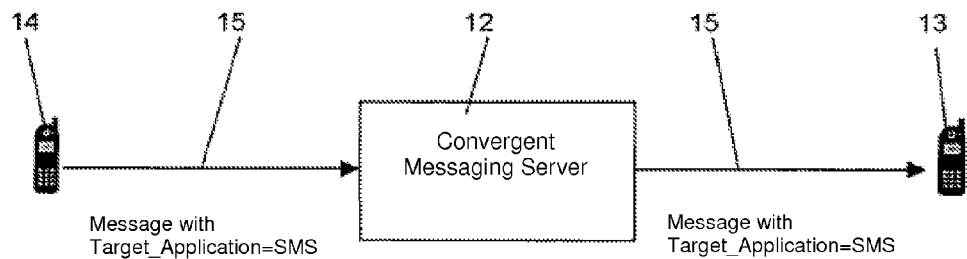
Figure 3:
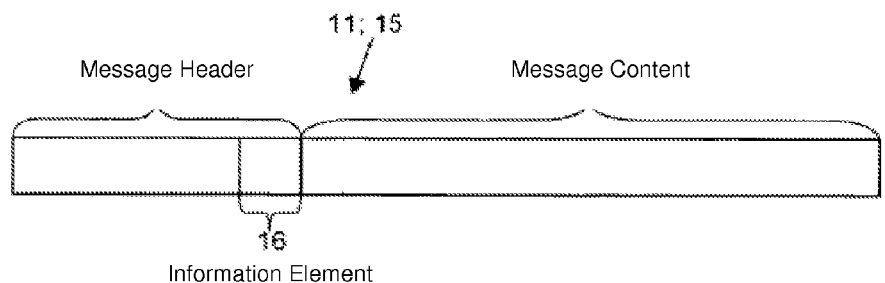

FIGS. 1 through 3 schematically show the operation principle of the inventive method.

FIG. 1 shows a communications network 10, for example a mobile radio network or the Internet. In the communications network 10, a convergent message is received that is to be forwarded to a mobile terminal 13 of a user.

As depicted schematically in FIG. 3, the convergent message 11 contains, for example, in the message header an information element 16 "Target_Application=SMS" that identifies and marks the message content as a SMS. The convergent message 11 is now forwarded to a convergent messaging server 12 connected to the communications network 10. The convergent messaging server 12 receives the convergent message 11 and forwards it to the terminal device 13 of the intended user. In the terminal device 13 the content of the convergent message 11 is identified based on the information element Target_Application=SMS as a SMS and forwarded to the appropriate SMS application on the terminal device 13, e.g. a SMS client, that is intended for the presentation or processing of the SMS message content.

FIG. 2 shows a transmission of a convergent message between two mobile terminals 14 and 13. The terminal device 13 that generates the convergent message 15 utilizes the information element 16 that is provided according to the invention to classify the message accordingly as a SMS in such a way that it inserts, for example, the information element Target_Application=SMS into the message header. The convergent message 15 is now forwarded to a convergent messaging server 12. The convergent messaging server 12 receives the convergent message 15 and forwards it to the mobile terminal 13 of the intended recipient. Because of the information element Target_Application=SMS that is contained in the message, the terminal device 13 is induced to use a certain application to interpret and display the message content. In the shown example, a SMS application, which handles and processes the message as a SMS, is activated in the terminal device 13.

List of Reference Numerals

| | |
|---|---|
| 10 | Communications network |
| 11 | Message |
| 12 | Convergent messaging server |
| 13 | Terminal device |
| 14 | Terminal device |
| 15 | Message |
| 16 | Information element |

What is claimed is:

1. A method for services identification for convergent messaging systems that combines the functionalities of different existing messaging services on a higher-level common messaging platform, wherein a convergent message (11;15) is exchanged between a sender device (10;14) and at least one recipient device (13) via a communications network (10), the method comprising:

inserting, by the sender device or a central device (12) connected to the communications network (10), an information element (16) containing information regarding the message type or relating to the handling of the message into the message structure of the convergent message (11;15), receiving, at the recipient device, the message (11;15) containing the information element (16), wherein the information element contains information to identify a messaging client that is available at the recipient device (13) to control the handling of the convergent message (11; 15), and interpreting, at the recipient device, the information element contained in the convergent message to appropriately classify messages that are generated by the sender device and induce the recipient device to which the convergent message is sent to use a certain messaging client to interpret and/or display the message content.

2. A method as set forth in claim 1, wherein the recipient (13) forwards the message to said messaging client identified by the identifying information in the information element.

3. A method as set forth in claim 1, wherein the messaging client is a hardware or software application.

4. A method as set forth in claim 1, wherein the central device (12) is designed to receive, to process, and to forward convergent messages.

5. A method as set forth in claim 1, wherein the central device (12) is configured to receive messages of different message types, which messages are converted into corresponding convergent messages and forwarded.

6. A method as set forth in claim 1, wherein the central device (12) is a convergent messaging server.

7. A convergent messaging system for performing the method as set forth in claim 1 that is suitable for transmitting a convergent message (11;15) via a communications network (10) from a sender device (10;14) to at least one recipient (13), wherein an information element (16) that comprises information regarding the message type or relating to the handling of the message is contained in the message structure of the convergent message (11;15).

8. A data processing program embodied on a non-transitory storage medium and incorporating a program code which, when executed on a data processing unit, performs a method as set forth in claim 1.

9. A data processing program product embodied on a non-transitory storage medium and comprising a program code that is executable on a data processing unit for performing the method as set forth in claim 1.

* * * * *